United States Patent [19]
Weidhaas et al.

[11] 4,043,026
[45] Aug. 23, 1977

[54] METHOD OF MAKING CONNECTOR FOR LIGHT-CONDUCTIVE FIBERS

[75] Inventors: Wolfgang Weidhaas, Cologne; Hans-Joachim Trappenberg, Langenfeld, both of Germany

[73] Assignee: Felten & Guilleaume Carlswerk AG, Cologne, Germany

[21] Appl. No.: 682,172

[22] Filed: Apr. 30, 1976

[30] Foreign Application Priority Data
June 25, 1975 Germany .............................. 2528270

[51] Int. Cl.² .............................. G02B 5/14; G02B 7/00
[52] U.S. Cl. ..................................... 29/592; 29/416; 29/423; 264/152; 264/338; 350/96 C
[58] Field of Search ................. 29/592, 593, 407, 416, 29/423, 464; 264/152, 338, 235, 346; 350/96 C

[56] References Cited
U.S. PATENT DOCUMENTS
| | | | |
|---|---|---|---|
| 3,734,594 | 5/1973 | Trambarulo | 350/96 C |
| 3,885,293 | 5/1975 | Bateman, Jr. et al. | 29/416 |
| 3,923,371 | 12/1975 | Dalgleish | 350/96 C |
| 3,936,143 | 2/1976 | Sato | 350/96 C |

FOREIGN PATENT DOCUMENTS
| | | | |
|---|---|---|---|
| 2,440,527 | 3/1975 | Germany | 350/96 C |
| 1,430,979 | 4/1976 | United Kingdom | 350/96 C |

*Primary Examiner* — Victor A. DiPalma
*Attorney, Agent, or Firm* — Michael J. Striker

[57] ABSTRACT

A connector for light-conductive fibers includes a connecting body provided with at least one receiving passage and at least two aligning passages. The connecting body is subdivided into two connecting members along a plane normal to the axes of the passages, the connecting members having contact surfaces at the subdividing plane which are adapted to abut one another when the two connecting members are assembled. The end portions of the light-conducting fibers are introduced into the receiving passages so that the end faces thereof are flush with the contact surfaces, and the connecting members are assembled in alignment with one another, using aligning elements accommodated in the aligning passages of the connecting members. The connecting body may be produced by embedding auxiliary elements corresponding in diameters to the aligning elements and the fibers, in a body of a hardenable material, and by removing the auxiliary elements from the body after the hardening of the material. The assembled connecting body is accommodated in a housing which includes a hollow cylindrical socket having an externally threaded portion, a coupling nut of cup-shaped configuration which has an internal thread engaging the threaded portion of the socket, and a cover member received between the socket and the nut, which has a flanged configuration and which closes the open end of the socket. Elastically yieldable support means may be used for supporting the connecting body in the housing.

13 Claims, 3 Drawing Figures

METHOD OF MAKING CONNECTOR FOR LIGHT-CONDUCTIVE FIBERS

BACKGROUND OF THE INVENTION

The present invention relates to a connector for connecting light-conductive fibers, and to a method of manufacturing such connector.

There are already known various connecting arrangements for connecting end portions of light-conductive fibers in which the relative positions of the cooperating end portions of the light-conductive fibers are adjusted so as to make the fibers coaxial with one another in such a manner that the respective cooperating end portions of the light-conductive fibers, such as glass fibers, are eccentrically accommodated in two eccentrically arranged asymmetrical bodies. When the cylindrical bodies are rotated, the two cooperating end portions of the fibers move along eccentric circular paths. When the positions of the end portions of the fibers are preadjusted to a sufficient extent, then these circular paths intersect, which means that the cores of the fibers can be precisely adjusted in positions with respect to one another, or centered. However, this known arrangement is disadvantageous in some respects. First of all, the connecting arrangement is relatively large, due to the eccentric arrangement of the fibers and of the cylindrical bodies. Moreover, the accurate support of the two cylindrical bodies, and especially the eccentrically arranged passages for accommodating the end portions of the fibers, result in high demands for precision in manufacturing the connecting arrangement. Furthermore, this connecting arrangement must be repeatedly adjusted at each disassembling and re-assembling of the connecting arrangement, with the object in mind to maximize the amount of energy transmitted through the light-conductive fibers. An optical testing signal is needed for adjusting the positions of the end portions of the light-conductive fibers, and it is also necessary to obtain data concerning the transmitted signal and the received signal. This means that the light-conductive fiber conductor which is to be connected at one location must be accessible at two other locations, that is the transmitting location for the test signal, and the receiving location therefor. In practice, the two other locations are the repeater stations located closest to the connecting location in both directions therefrom.

There is also already known a different connecting arrangement for connecting light-conductive fibers, which includes a housing equipped with adjusting arrangements each of which supports one end portion of a light-conductive fiber which is to be aligned with the other end portion of a different light-conductive fiber, the end portions of the fibers being received in the adjusting arrangement in roughly preadjusted positions. The adjusting arrangements are capable of centering the end portions of the light-conductive fibers, such as glass fibers, with respect to one another in that at least a section of the end portion of one of the light-conductive fibers is supported in its associated adjusting arrangement in an elastically deformable body, which body can be elastically deformed by an outer pressure exerted thereupon by an adjustable pressure element so that the end portion of the fiber embedded therein is displaced relative to the other end portion. In order to be able to accurately adjust the positions of the end portions of the fibers, a reduction transmission may be interposed between the housing and the pressure element. However, even this arrangement is possessed of similar disadvantages as those mentioned above; especially, the connecting arrangement must be readjusted after each disassembling and reassembling operation, and it is also relatively bulky, and it further necessitates access to the two locations for transmission of the test signal through the conductor line, and monitoring of the test signal.

SUMMARY OF THE INVENTION

Accordingly, it is an object of the present invention to avoid the disadvantages of the prior art connecting arrangements.

More particularly, it is an object of the present invention to provide a connector for light-conductive fibers which is simple in construction and reliable in operation.

It is a further object of the present invention to provide a conductor of the type here under consideration which does not require laborious adjusting operations.

It is a concomitant object of the present invention to devise a method of manufacturing such a connector.

Yet another object of the present invention is to provide a method of manufacturing a connector for connecting light-conductive fibers which does not require an elaborate equipment and a high degree of skill on the part of the operating personnel, for its accomplishment.

In pursuance of these objects and others which will become apparent hereafter, one feature of the present invention resides, briefly stated, in a method of coaxially connecting light-conductive fibers, which comprises the steps of forming a connecting body with at least one receiving passing and at least two aligning passages which are axially parallel to the receiving passage; subdividing the connecting body along a plane substantially normal to the axes of the passages into two connecting members which have contact surfaces at the above-mentioned plane; introducing the end portions of the light-conductive fibers into the receiving passages of the connecting members so that the end faces of the fibers are flush with the contact surfaces; and alignedly connecting the connecting members with one another so that the contact surfaces abut one another, including accommodating aligning elements in the aligning passages. According to a further concept of the present invention, the forming step includes embedding auxiliary elements corresponding in diameters to the light-conductive fibers and to the aligning elements, respectively, in a body of hardenable material, and removing the auxiliary elements from the body subsequent to hardening thereof. Preferably, the embedding includes molding the hardenable material around the auxiliary elements.

A particular advantage of the method of the present invention is to be seen in the fact that a connecting body is obtained which incorporates two connecting members which can always, and repeatedly, be aligned with one another subsequent to the introduction of the aligning elements into the respective aligning passages, in such a manner that the end faces of the light-conductive elements are exactly coextensive with one another, that is, without lateral offsetting, which is accomplished in an especially simple manner.

An important advantage of the connecting body manufactured according to the method of the present invention is to be seen in the fact that the previously present need for adjusting the positions of the end portions of the light-conductive fibers subsequent to the assembling of the connecting body is now eliminated, even though the connecting body consists of two connecting members. A further advantage resides in the fact that the manufacture of the connecting body does not require any operations which would have to be performed with an accuracy of, for instance, one-tenth of micrometer, which is the precision which is needed during drilling of the receiving passage for accommodating the light-conductive fibers in the known connecting arrangements.

In a further development of the present invention, it is advantageous if the auxiliary elements are provided at their circumferential surfaces with a separating or separation-enhancing agent prior to molding the hardenable material around such auxiliary elements. Experience has shown that it is very advantageous to apply a layer of vacuum grease to the auxiliary elements, and to subject the so-treated auxiliary elements to a deposition of a metallic coating, especially silver or aluminum coating. These measures render it possible to more easily remove the auxiliary elements from the molded connecting body subsequent to the hardening thereof. An important consideration in selecting or rejecting the auxiliary elements is that they have extremely smooth outer surfaces, a constant diameter, and that they not be bent. It is further advantageous, according to another aspect of the present invention to so select the hardenable material which is to be molded around the auxiliary elements that it retains its volume during the hardening thereof. In other words, the hardenable material should be such as not to expand or shrink during the hardening. It is very important to use such material in order to, on the one hand, assure a removal of the auxiliary elements from the hardened connecting body and, on the other hand, warrant that the passages which remain in the connecting body after the removal of the auxiliary elements therefrom retain their dimensions. When the hardened material of the connecting body has such mechanical properties that the body changes its dimensions when subjected to heat treatment, the body may be either cooled or heated, depending on the material, in order to facilitate the removal of the auxiliary elements from the receiving and aligning passages.

According to a further concept of the present invention, a connector for light-conductive fibers comprises, in combination, a connecting body which includes two connecting members each having a contact surface, aligning elements projecting beyond the respective contact surface, and aligning passages which accommodate the projecting portions of the aligning elements when the contact surfaces abut each other, each of the connecting members having an end portion of a light-conductive fiber embedded therein so that an end face thereof is flush with the respective contact surface and so that the end portions of the fibers are coaxial with one another when the contact surfaces abut each other; and means for attaching the connecting members to one another so as to prevent displacement of the contact surfaces away from each other. Of course, the connecting body of the connector can be manufactured in accordance with the method of the present invention.

Advantageously, the attaching means includes a housing which surrounds the connecting body and includes a hollow cylindrical socket having an externally threaded portion, a coupling nut of cup-shaped configuration having an internal thread which engages the threaded portion of the socket, and a cover member received between the socket and the nut, having a flanged configuration, and closing the open end of the socket.

As a result of the use of the connecting members which are manufactured according to the method of the present invention, and of the aligning elements accommodated in the aligning passages, an optically and mechanically disassemblable connection of the end portions of the light-conductive fibers is obtained which does not necessitate any additional adjustment of the positions of the end portions of the fibers or of the connecting members subsequent to the assembling of the connecting members and to the simple sliding of the aligning elements into the aligning passages of the connecting members. This is attributable to the fact that the adjusting elements, each of which can be rigidly received in one of the connecting members, and which exactly fit into the adjusting passages of the other connecting member which forms a part of the connecting body, take care of an exact preadjustment of the two connecting members and thus also of the exact coextensive juxtaposition of the two cooperating end faces of the light-conductive fibers.

When the housing of the connector is constructed as mentioned above, it is further advantageous if the threaded portion of the socket has an inner diameter which is greater than the inner diameter of the remainder of the socket, and if the wall thickness of a portion of the cover which extends into the socket is substantially equal to the difference between the inner diameter of the threaded portion of the socket and the inner diameter of the remainder for the socket. When the housing is constructed in this manner, according to a currently preferred embodiment of the present invention, the socket and cover bound with one another an uninterrupted cylindrical shape axially delimited by circular end surfaces of the socket and of the cover, respectively, and radially defined by the cylindrical inner surfaces of the remaining portion of the socket and of the portion of the cover which extends into the socket. Then, the connecting body is accommodated in the cylindrical space. In this embodiment of the present invention, when the cup-shaped nut is tightened, the cover is displaced axially of the socket so that the distance between the end faces which axially delimit the above-mentioned space is reduced until the connecting body is securely clamped thereby and prevented from axial movement of the connecting members relative to one another.

In accordance with a further aspect of the present invention, the cover has an outwardly projecting flange which abuts against the end face of the threaded portion of the socket, so that the extent to which the cup-shaped nut can be tightened is limited by such abutment so that neither the cover nor the connecting body can be damaged by excessive tightening of the nut. Both end faces of the housing, that is the end face of the socket and the end face of the cover, are provided with openings through which the light-conductive fibers extend from the exterior of the housing into the interior thereof. It is further advantageous to prevent rotation of the cover during the tightening of the nut in order to avoid damage to the light-conductive fiber passing through the opening thereof which is achieved, according to the invention, by forming projections and complementary recesses on the socket and on the cover, respectively, which permit the axial displacement of the cover relative to the socket but prevent rotation of the cover with respect to the socket. In order to assure that the cover will be assembled with the socket always in the same relative position with respect thereto, the projections and the complementary recesses may have different widths.

In order to prevent the edging of the connecting body during the tightening of the cup-shaped nut, it is further proposed according to the present invention to interpose elastic annular rings between the inner end faces which axially delimit the space in which the connecting body is accommodated, and the latter. These annular rings constitute an elastically yieldable support for the connecting body. When the two connecting members are each to be supported in its associated housing component, that is the socket, on the one hand, and the cover, on the other hand, it is advantageous to use silicon rubber support elements for this purpose, which mount the connecting members in the housing components in a resilient manner.

When such support elements are used for mounting the connecting members in the respective housing components, it is achieved, on the one hand, that the connecting members cannot fall out of the associated housing components during the disassembly of the housing and, on the other hand, sufficient elasticity is present which compensates for the possible non-symmetric mounting of the connecting members in their associated housing components. However, a similar effect can also be obtained by using conventional mechanical means, such as pins, springs or set screws in the respective housing component, and cooperating elongated openings in the connecting body.

In order to facilitate the introduction of the respective aligning element which is ridigly supported in one of the connecting members, into the aligning passage in the connecting member, and also to facilitate introduction of the light-conductive fibers which are to be connected, in each of the connecting members, it is to advantage, according to a further concept of the present invention, to round off the ends of the aligning elements, and to enlarge the end portions of the receiving and aligning passages of the respective connecting members, preferably in a conical manner.

The connector of the present invention and the method of manufacturing the same are not only suited for connecting two end portions of light-conductive fibers with one another, but it is also conceivable that similar concepts could be used in constructing and manufacturing a connector capable of connecting several pairs of end portions of light-conductive elements. Also, while only two aligning elements may be used for aligning the connecting members with one another to constitute the connecting body, it is equally possible that a greater number of such aligning elements could be used if desired or necessary, particularly in connectors which connect more than one pair of light-conductive fibers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DISCUSSION OF THE PREFERRED EMBODIMENT

Figure 1:
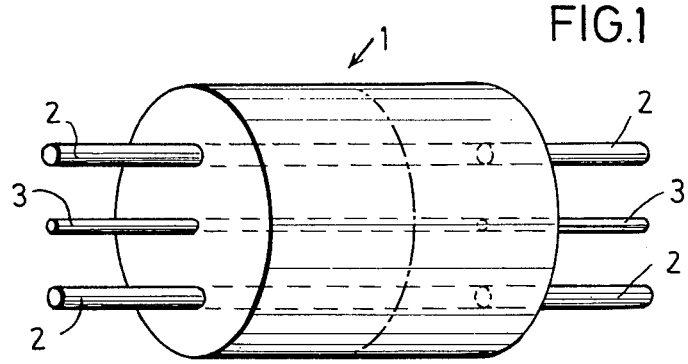
FIG. 1 is a perspective view of a connecting body according to the present invention during the manufacture thereof.
Figure 3:
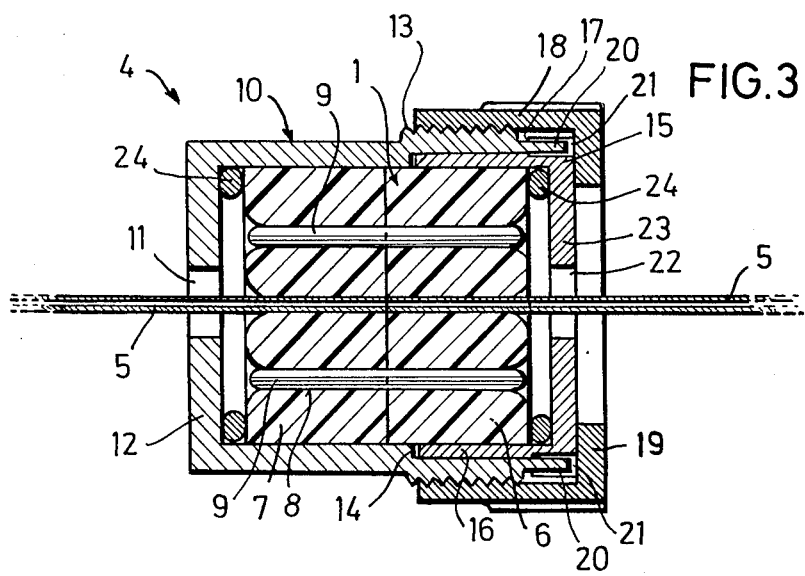
FIG. 3 is an axial section of a connector of the present invention.

Referring now to the drawings, and first to FIG. 1, it will be seen therein that a hardened cylindrical connecting body 1 of a hardenable synthetic plastic material has two auxiliary elements 2 and one auxiliary element 3 embedded therein. The auxiliary element 3 may be either a light-conductive fiber, a non-optical glass fiber, or a suitable steel wire. The diameter of the auxiliary element corresponds to the diameter of a light-conductive fiber 5 which is to be connected by a connector 4 which is illustrated in FIG. 3. The auxiliary elements 2 and 3 extend axially parallel to one another.

The connecting element 1 can be obtained by molding a hardenable synthetic plastic material around the auxiliary elements 2 and 3, for instance in a mold of a conventional construction. The material for the connecting body 1 may be such hardenable synthetic plastic material which retains its volume during the hardening thereof, that is, it does not expand or shrink during the hardening. When the material of the connecting body 1 has hardened, the auxiliary elements 2 and 3 are withdrawn from the body 1, leaving behind passages 8. The connecting body 1 is subdivided, along a plane substantially normal to the elongation of the passages 8, into two connecting members 6 and 7 which have contact surfaces along the subdividing plane.

Figure 2:
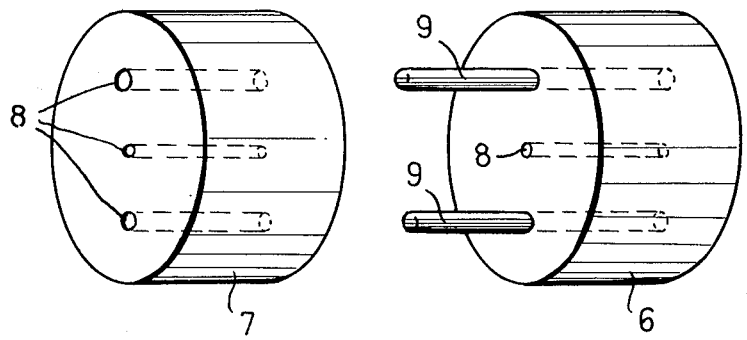
FIG. 2 is a perspective view of two connecting members which together constitute a connecting body.

The connecting members 6 and 7 are again illustrated in FIG. 2, spaced from one another as they are prior to assembling them into the connecting body 1. Two aligning elements 9 are rigidly accommodated in the aligning passages 8 of the connecting member 6, as for instance by gluing or otherwise bonding the aligning elements 9 in the respective passages 8, the aligning elements 9 extending beyond the contact surface of the connecting member 6. The end of the aligning elements 9 are rounded off.

Further details of the connecting body 1 and of the elements associated therewith can be ascertained from FIG. 3, in which a connector has been designated, in toto, with the reference numeral 4. The connector 4 includes a cylindrical socket 10 which has an end wall 12 provided with an opening 11, and is provided with an externally threaded portion 3 at its end remote from the end wall 12. The inner diameter of the threaded portion 13 of the socket 10 is larger than the inner diameter of the remainder of the socket 10, so that the interior of the socket has a recess 14. The open end of the socket 10 is closed by a cover 15 of a flanged configuration which has a projecting portion 16 adapted to be received into the socket 10, the thickness of the portion 16 of the cover 15 being substantially equal to the difference between the inner diameter of the threaded portion 13 of the socket 10 and the inner diameter of the remainder of the socket 10. The cover 15 has a flange 17 which serves as an abutment, in cooperation with an end face of the threaded portion 13 of the socket 10, for preventing excessive introduction of the cover portion 16 into the interior of the socket 10. A cup-shaped nut 18 surrounds the cover 15 and is threaded on the threaded portion 13 of the socket 10.

The cup-shaped nut 18 has a ring-shaped marginal portion 19 which contacts the cover 15 during the tightening of the cup-shaped nut 18 and displaces the cover 15 axially of the socket 10.

The connecting body 1 is located in the interior of the socket 10. As seen in FIG. 3, the light-conductive fibers 5, that is, the end portions thereof, are accommodated in the passages 8 remaining in the body 1 after the withdrawal of the auxiliary element 3, and are retained in, for instance, by using an adhesive. The end faces of the end portions of the cooperating light-conductive fibers 5 are flush with the contact surfaces of the connecting members 6 and 7 so that they are coextensively juxtaposed with one another in the assembled condition of the connecting body 1. In order to facilitate the penetration of the light rays across the interface between the end faces of the light-conductive fibers 5, it is possible, in a conventional manner, to apply immersion liquid to such end faces.

Two projections 20 are provided at the threaded portion 13 of the socket 10, substantially diametrally opposite to one another. On the other hand, complementary recesses 21 are provided in the flange 17 of the cover 15, and the projections 20 are fittingly received therein so as to permit axial displacement of the cover 15 relative to the socket 10, but to also prevent rotational displacement of the former with respect to the latter. Annular rings 24 made of synthetic plastic material or of rubber are arranged between the end faces of the connecting body 1 and the end wall 12 of the socket 10, and an end wall 23 of the cover 15 which is provided with an opening 22, which annular elements 24 are elastically yieldable and support the connecting body 1 in the connector 4, and protect connecting body 1 from being damaged during tightening of the cup-shaped nut 18.

In order to facilitate introduction of the light-conductive fibers 5 and of the aligning elements 9 into the respective passages 8, the end portions of the passages 8 are enlarged, especially in a conical fashion.

In order to assure that the cover 15 will be assembled with the socket 10 always in the same relative position with respect thereto, the projections 20 and the recesses 21 at the opposite sides of the respective socket 10 and cover 15 are of different configurations so that the respective projection 20 will be compatible only with its corresponding recess 21 but not with the other recess 21. However, it is also possible to so circumferentially distribute the projections 20 and recesses 21 that only assembly of the socket 10 with the cover 15 in one position of the latter is possible.

The components of the housing of the coupling 4, except for the connecting body 1 and the elements embedded therein, are preferably made of a non-corroding material such as brass. The hardenable synthetic plastic material which is used for producing the connecting body 1 is preferably an epoxy resin, that is a material which changes its volume only to a negligible extent during the hardening thereof.

It will be understood that each of the elements described above, or two or more together, may also find a useful application in other types of constructions differing from the types described above.

While the invention has been illustrated and described as embodied in a connector for light-conductive fibers, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the accompanying claims:

1. A method of coaxially connecting light-conductive fibers, comprising the steps of forming a connecting body with at least one receiving passage and at least two aligning passages axially parallel to said receiving passage; subdividing said connecting body along a plane substantially normal to the axes of said passages into two connecting members which have contact surfaces at said plane; introducing the end portions of the light-conductive fibers into the receiving passages of the connecting members so that the end faces of the fibers are flush with said contact surfaces; and alignedly connecting said connecting members with one another so that said contact surfaces abut one another, including accommodating aligning elements in said aligning passages.

2. A method as defined in claim 1, wherein said forming step includes embedding auxiliary elements corresponding in diameters to the light-conductive fibers and to the aligning elements, respectively, in a body of hardenable material, and removing said auxiliary elements from said body subsequent to hardening thereof.

3. A method as defined in claim 2, wherein said embedding includes molding the hardenable material around said auxiliary elements.

4. A method as defined in claim 3, and further comprising the step of providing a layer of separation-enhancing agent to said auxiliary elements prior to said forming step.

5. A method as defined in claim 4, wherein said providing step includes applying vacuum grease to said auxiliary elements.

6. A method as defined in claim 5, wherein said providng step further includes coating the layer of vacuum grease with a layer of metallic substance.

7. A method as defined in claim 6, wherein said metallic substance is silver.

8. A method as defined in claim 6, wherein said metallic substance is aluminum.

9. A method as defined in claim 3, wherein the hardenable material is so selected as to retain its volume during the hardening thereof.

10. A method as defined in claim 3, wherein said forming step further includes subjecting the body of hardened material to heat treatment prior to the removing of said auxiliary elements to facilitate the same.

11. A method as defined in claim 10, wherein said heat treatment includes heating said body.

12. A method as defined in claim 10, wherein said heat treatment includes cooling said body.

13. A method as defined in claim 1, wherein said connecting step includes rigidly accommodating said aligning elements in selected aligning passages of said connecting members so as to project beyond the respective contact surface, and moving said connecting members toward one another with the projecting portions of said aligning elements in alignment with the remaining aligning passages.

* * * * *